United States Patent
VanZyl et al.

(10) Patent No.: US 12,239,995 B2
(45) Date of Patent: Mar. 4, 2025

(54) METHOD AND SYSTEM FOR MONITORING A HYDRAULIC SYSTEM OF A COMMINUTION APPARATUS

(71) Applicant: Metso Outotec Sweden AB, Trelleborg (SE)

(72) Inventors: Ian VanZyl, Baldivis (AU); Carl Nicholls, Forrestdale (AU)

(73) Assignee: Metso Outotec USA Inc., Brookfield, WI (US)

( * ) Notice: Subject to any disclaimer, the term of this patent is extended or adjusted under 35 U.S.C. 154(b) by 635 days.

(21) Appl. No.: 17/415,885

(22) PCT Filed: Dec. 18, 2019

(86) PCT No.: PCT/EP2019/086114
§ 371 (c)(1),
(2) Date: Jun. 18, 2021

(87) PCT Pub. No.: WO2020/127596
PCT Pub. Date: Jun. 25, 2020

(65) Prior Publication Data
US 2022/0072560 A1     Mar. 10, 2022

(30) Foreign Application Priority Data

Dec. 21, 2018  (EP) ..................................... 18215473

(51) Int. Cl.
*B02C 25/00* (2006.01)
*B02C 1/00* (2006.01)
*G05D 16/20* (2006.01)

(52) U.S. Cl.
CPC .............. *B02C 25/00* (2013.01); *B02C 1/005* (2013.01); *G05D 16/2026* (2013.01)

(58) Field of Classification Search
CPC ...... B02C 1/005; B02C 25/00; G05D 16/2026
See application file for complete search history.

(56) References Cited

U.S. PATENT DOCUMENTS 4,730,092 A * 3/1988 Eggert .................. H01H 33/34
                                                  218/84
10,520,384 B2 * 12/2019 Adeeb ...................... F15B 1/08
(Continued)

FOREIGN PATENT DOCUMENTS

CN      105714872 A      6/2016
CN      107246387 A      10/2017
(Continued)

OTHER PUBLICATIONS

International Search Report and Written Opinion for International Application No. PCT/EP2019/086114 mailed Mar. 2, 2020.
(Continued)

*Primary Examiner* — M. N. Von Buhr
(74) *Attorney, Agent, or Firm* — Andrus Intellectual Property Law, LLP

(57) ABSTRACT

The present disclosure relates to a monitoring system for a hydraulic system in a comminution apparatus including at least one pressurized accumulator. The monitoring system includes at least one pressure sensor and a control unit, wherein the pressure sensor is connected to the control unit. The pressure sensor is arranged to measure a pressure in the at least one accumulator and the control unit is configured to determine that a pressure in the accumulator is outside of a predefined range. The control unit is further configured to control a pressure regulating system that is arranged to restore the pressure in the pressurized accumulator.

13 Claims, 1 Drawing Sheet

(56) References Cited

U.S. PATENT DOCUMENTS

| | | | |
|---|---|---|---|
| 10,690,153 B1 * | 6/2020 | LeBlanc | F15B 13/081 |
| 10,940,481 B2 * | 3/2021 | Rust | B02C 1/025 |
| 2009/0256015 A1 | 10/2009 | Torres et al. | |
| 2017/0274383 A1 | 9/2017 | Rust et al. | |
| 2018/0120185 A1 | 5/2018 | Adeeb | |
| 2020/0149249 A1 * | 5/2020 | Rannow | E02F 3/432 |

FOREIGN PATENT DOCUMENTS

| | | | | |
|---|---|---|---|---|
| EP | 2599554 A2 * | 6/2013 | | B02C 18/0084 |
| FR | 2614665 A1 * | 11/1988 | | |

OTHER PUBLICATIONS

International Preliminary Report on Patentability for International Application No. PCT/EP2019/086114 mailed Dec. 11, 2020.
Examination Report for Australian Patent Application No. 2019400786, dated Sep. 19, 2024.
Office Action for Chinese Patent Application No. 2019800831970, dated Oct. 17, 2022.
Office Action for Canadian Patent Application No. 3,123,489, dated Nov. 7, 2024.

\* cited by examiner

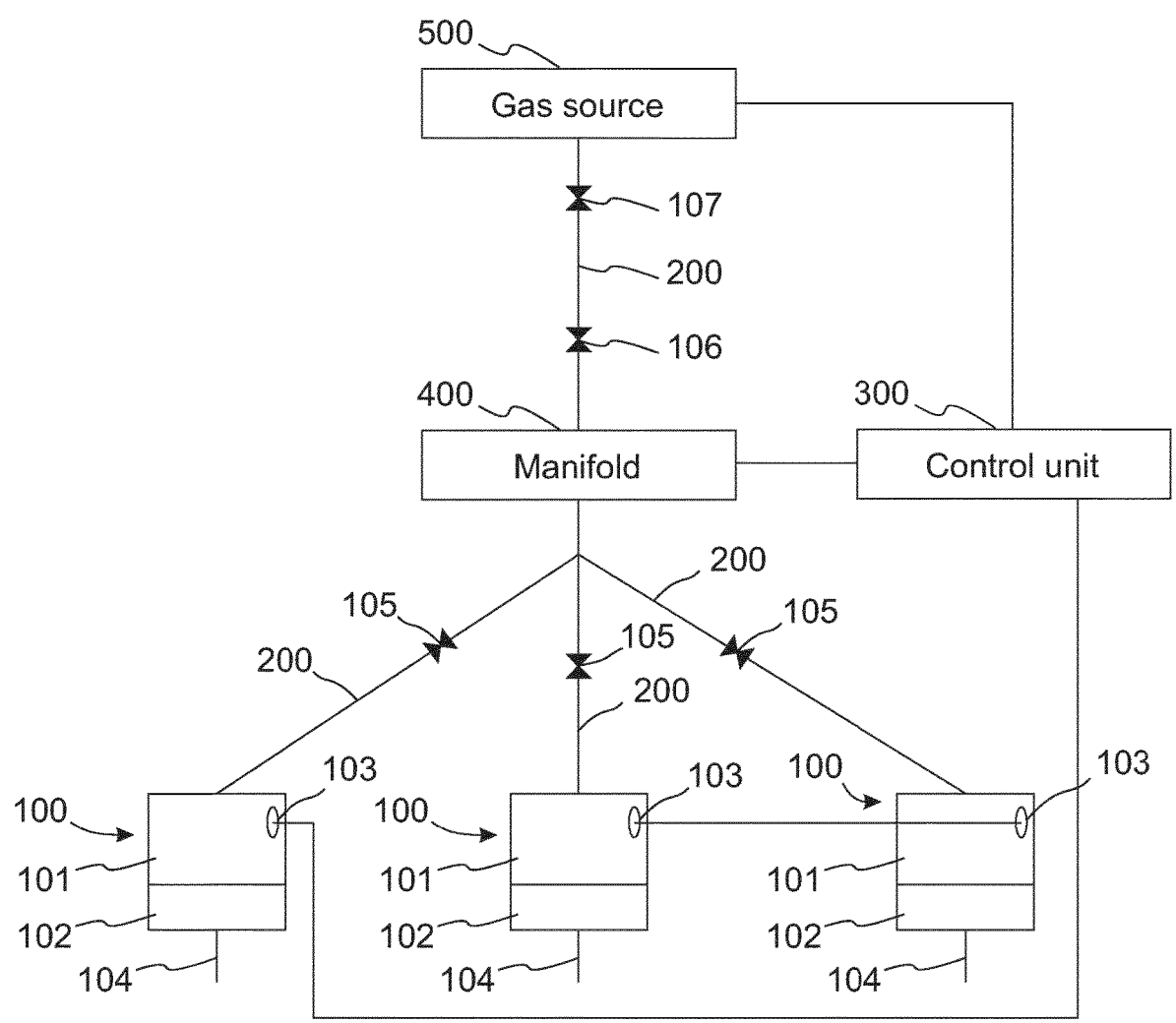

METHOD AND SYSTEM FOR MONITORING A HYDRAULIC SYSTEM OF A COMMINUTION APPARATUS

CROSS-REFERENCE TO RELATED APPLICATIONS

This application is the U.S. national stage application of International Application PCT/EP2019/086114, filed Dec. 18, 2019, which international application was published on Jun. 25, 2020, as International Publication WO 2020/127596 A1 in the English language. The International Application claims priority of European Patent Application No. 18215473.2 filed Dec. 21, 2018.

FIELD OF THE INVENTION

The present invention relates to comminution equipment, especially a hydraulic system for such equipment and to a monitoring system for such hydraulic system.

BACKGROUND OF THE INVENTION

When for example crushing or grinding rock, ore, cement clinker and other hard materials, roller crushers, gyratory crushers, cone crushers and other different types of crushers may be used. They all have the fact in common that they may use a hydraulic system to support the parts doing the actual crushing and it is often arranged to maintain a suitable crushing gap and achieving the required crushing forces in the equipment. Due to the forces present in this type of equipment, accumulators are often used to act as overload protection in the case of e.g. tramp metal reaching the crusher where the accumulators are used to absorb the occurring shock loads. Such accumulators are often divided into two chambers, one filled with hydraulic liquid and one chamber filled with a pressurized gas such as nitrogen. The two chambers are typically divided by means of a bladder, piston or similar such that the hydraulic liquid is pressurized by the gas but without mixing of the two. Thus, when an overload event, such as tramp metal, occurs, the accumulators can compensate for this and damage to the equipment can be avoided. Since the accumulators must maintain a specified pressure to function as designed and since there is always leakage over time, the gas chambers of the accumulators need to be re-charged from time to time. This is usually done by hand and one accumulator at a time.

SUMMARY OF THE INVENTION

An object of the invention is to overcome, or at least lessen the problems involved with re-charging of the accumulators. For example, it is often required that staff determine the pressure in each and every one of the accumulators and based on that information it is decided whether or not re-charging is required. This is usually done by hand and on the initiative of the staff. This brings with it the risk that it is forgotten or postponed, sometimes for a long time which leads to a risk of potentially catastrophic failures of major components in the equipment, e.g. the rods that are attached to the piston in the cylinder, the mainframe or adjustment ring of cone crushers.

A particular object is to provide a monitoring system for a hydraulic system in a comminution apparatus which includes at least one pressurized accumulator. The monitoring system comprises at least one pressure sensor which is arranged to measure a pressure at the at least one accumulator and is connected to a control unit which is configured to determine whether or not a pressure in the accumulator is outside of a predefined range and the control unit is further configured to control a pressure regulating system arranged to restore the pressure in the accumulator if so required. This structure has the advantage that the pressure in the accumulators can be monitored and even re-charged automatically.

In accordance with an embodiment of the monitoring system, the pressurized accumulator comprises a first chamber containing hydraulic liquid and a second chamber containing a pressurized gas. The first chamber is pressurized by hydraulic power units, e.g. a pump, and the second chamber has a stored pressure and these two chambers hold pressure against each other and sit in equilibrium.

In accordance with an embodiment of the monitoring system, the second chamber of each accumulator is connected to a source of pressurized gas.

In accordance with an embodiment of the monitoring system, the control unit is configured to continuously monitor the pressure in the accumulator. By continuously monitoring the pressure in the second chamber, it can be achieved that for example a pressure drop or spike is detected immediately and required action can be taken.

In accordance with an embodiment of the monitoring system, the pressure sensor is arranged to measure a gas pressure in said second chamber. In comparison with measurements made of the pressure in the hydraulic liquid, measurements of the gas pressure have the advantage that a more reliable and accurate measurement can be obtained. The hydraulic fluid circuit is more prone to sudden spikes and no pre-reading is available. In the hydraulic system there are variations all the time and not necessarily due to tramp events. With the system of the present invention a more accurate measure is provided. If the pressure in the gas chamber is changed, there must be a tramp event and as such false alarms can be avoided or at least reduced. Further, the present system is not or at least less affected by environmental conditions such as ambient temperature.

In accordance with an embodiment of the monitoring system, the control unit is configured to determine that a pressure in said second chamber is outside of a predefined range. By defining pre-set ranges within which the pressure should be maintained, such that functioning of the accumulator system can be guaranteed, malfunctioning due to pressure loss in the accumulators can be avoided.

In accordance with an embodiment of the monitoring system, the gas comprises nitrogen. Nitrogen is a well proven gas for this type of application.

In accordance with an embodiment of the monitoring system, the control unit is configured to control a pressure regulating system arranged to restore a pressure in said second chamber. By connecting the control unit to a re-charging system for the second chamber, i.e. the chamber comprising the pressurized gas, an automatic, or at least semi-automatic re-charging of the accumulators can be achieved. It is possible to configure the control unit to automatically re-charge the pressurized gas in the second chamber should the pressure fall below a pre-defined threshold value. It is also possible to configure the control unit to set off an alarm or similar when the pressure in the second chamber falls below a pre-defined threshold value such that staff may be alerted and initiate re-charging of the second chamber.

In accordance with an embodiment of the monitoring system, the second chamber of each accumulator is connected to a source of pressurized gas via a manifold. A manifold allows for a compact valve unit by means of which all accumulators can be connected to a central source of pressurized gas, e.g. nitrogen. A manifold can also be used to connect the respective second chambers to each other, for example to obtain pressure equalization in a plurality of second chambers.

In accordance with an embodiment of the monitoring system, the manifold comprises solenoid valves arranged to be controlled by the control unit. Solenoid valves are convenient in that they allow for a signal having a relatively weak strength to control devices involving high forces. Other valves may also be applied, such as ball valves.

In accordance with an embodiment of the monitoring system, the control unit is configured to determine the pressure in the at least one accumulator at pre-defined time intervals. Controlling the pressure at pre-defined time intervals takes away the risk of negligence or oblivion of staff.

In accordance with an embodiment of the monitoring system, the control unit is configured to continuously determine the pressure in the at least one accumulator. Continuous monitoring allows for highest security and will be able to detect a pressure change as soon as it occurs.

In accordance with an embodiment of the monitoring system, the control unit is configured to determine the occurrence of a tramp event based on information from said pressure sensor.

According to a second aspect of the invention, there is provided a comminution apparatus comprising a monitoring system in accordance with the embodiments described herein.

According to a third aspect of the invention, there is provided a method of monitoring a hydraulic system in a comminution apparatus having a monitoring system in accordance with the embodiments described herein, the method comprising the steps of:

a. Arranging a pressure sensor at an accumulator of a hydraulic system of the comminution apparatus;
b. Transmitting output from the pressure sensor to a control unit;
c. Using the control unit to control a pressure regulating system arranged to restore the pressure in the at least one pressurized accumulator.

In accordance with an embodiment of the third aspect of the invention, the method comprises the step of d. Based on the output, determining the occurrence of a tramp event.

According to a fourth aspect of the invention, there is provided a use of a monitoring system in accordance with the embodiments described herein.

Other objectives, features and advantages of the present invention will appear from the following detailed disclosure, from the attached claims, as well as from the drawings. It is noted that the invention relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

As used herein, the term "comprising" and variations of that term are not intended to exclude other additives, components, integers or steps.

BRIEF DESCRIPTION OF THE DRAWINGS

The invention will be described in more detail and with reference to the appended drawings in which:

FIG. 1 shows a schematic structure of the disclosed invention.

DESCRIPTION OF EMBODIMENTS

The present invention will now be described more fully hereinafter with reference to the accompanying drawings, in which exemplifying embodiments of the invention are shown. The present invention may, however, be embodied in many different forms and should not be construed as limited to the embodiments set forth herein; rather, these embodiments are provided for thoroughness and completeness, and to fully convey the scope of the invention to the skilled addressee. Like reference characters refer to like elements throughout.

FIG. 1 shows a schematic structure of how the present invention can be organized. Three accumulators 100 are indicated in the drawing. The number of accumulators is of little relevance since different comminution equipment will require different numbers of accumulators 100. These accumulators are provided as a part of a hydraulic system 104 of the comminution equipment. Each of the accumulators comprises a first chamber 102 containing hydraulic oil and a second chamber 101 comprising pressurized gas, for example nitrogen. The two chambers are separated by means of for example a bladder, a piston or a diaphragm, or combinations thereof. The accumulators are provided to compensate and absorb sudden and often excessive load bursts. Such load bursts may for example occur during a so called tramp event, i.e. when an uncrushable object, for example a piece of metal, enters a crushing equipment. When such object enters e.g. a cone crusher, the hydraulic system has to handle a sudden and large load burst. This load burst is absorbed by the pressurized gas in the second chamber 101 which will act much like a shock absorber. The oil in the hydraulic system 104 will be forced towards the second chamber thus reducing the volume available to the gas and therefore increasing the pressure in the second chamber 101. At the end of the tramp event, the pressure in second chamber 101 will force the hydraulic oil back and out of the accumulator until a pressure balance is achieved. It is clear that there is a range of pressure within which this system will work as deigned and that high risks are involved in neglecting the monitoring of the pressure in the hydraulic system since a too low pressure may cause catastrophic failure of major components of e.g. a cone crusher. The present invention therefore suggests that pressure sensors 103 are mounted to each of the accumulators 100, for example at each of the second chambers 101, and that these sensors 103 are connected to a control unit 300. This control unit 300 is further connected to a valve arrangement 400 and possibly also to a source of pressurized gas 500. The pressure sensors 103 provide output to the control unit 300. This can be done continuously or intermittent, possibly only on request by the control unit 300. The control unit 300 is further connected to a valve arrangement 400 which is arranged to connect each of the second chambers 101 to a source of pressurized gas 500. The control unit 300 evaluates the output from the pressure sensors 103 and determines whether or not the pressure in each of the accumulators lie within a pre-defined range. Should the pressure in one or more of the second chambers 101 lie outside of the pre-defined range, within which it has been determined that the equipment will function as designed and fulfil the requirements placed thereon, the control unit 300 may automatically activate one or more valves in the valve arrangement 400 such that the pressure in the second chamber(s) in question can be restored. The valve arrangement 400 may in one embodiment comprise a manifold or manifold block comprising all required valves and connections. The valves used in such manifold or manifold block may comprise solenoid valves. Solenoid valves have the advantage that they can use weak signals to control high or very high pressures. In one embodiment, the second chambers 101 of the accumulators 100, the valve arrangement 400 and the gas source 500 may be connected by permanent piping, thus reducing or entirely avoiding work related to coupling the parts together when re-charging of the second chambers 101 is required. The control unit 300 may in one embodiment have a semi-automatic function and alert staff members, by means of messages, flashing lights, sound or any other suitable means, that re-charging of one or more second chambers 101 is required. The staff will then take the next step and make sure that this done.

Further, there may be ball valves 105, or other suitable valve types, arranged in connection to each of the second chambers. These valves 105 can be used to isolate individual accumulators for e.g. maintenance or in order to bleed down or other purposes. These valves 105 may be arranged up- or downstream of the valve arrangement 400, depending on how the valve arrangement 400 is structured. In any case, the valves 105 should only affect the second chamber 101 of a designated accumulator and not that of any other accumulator. Further, by opening all valves 105 and connecting them to a solenoid valve, an automatic system can be created. A control valve 106 may also be arranged to determine leakage before valve arrangement 400. If there is a break in the line, which sometimes may be very long, an alarm can be set of. A valve 107 may be provided which will close upon pressure loss. Other solutions are conceivable and may be applied with similar results.

The control unit 300 may also be connected to the gas source directly to control the supply of pressurized gas to the valve arrangement 400. This can be done to add a further step of security. In another embodiment, the gas source is always open towards the valve arrangement 400 and as soon as the valve(s) to one or more second chamber(s) is/are opened, re-charging will take place.

In another embodiment of the present invention, the pressure sensors in the second chambers 101 can be used to detect tramp events. Current solutions for detecting tramp events normally use vibration sensors comprising accelerometers arranged on the equipment. These accelerometers measure the level of vibrations and tramp events are detected in the output of these. However, they are susceptible to all kinds of vibrations, even vibrations originating in adjacent comminution equipment, making it hard to determine tramp events with a high degree of certainty. Thus, present solutions are only semi-reliable. The present invention instead uses the pressure sensors 103 in the second chambers 101. Live and continuous monitoring of the gas pressure in the second chambers 101 will replace the use of accelerometers to monitor system tramping. A corresponding spike in gas pressure within the accumulators will occur as a tramp event occurs. As it turns out, this reading will be insulated from any background noise from other sources within the plant, meaning it will be a much more accurate measure of the occurrence and severity of a tramp event. Ongoing efforts to collect data and monitor the crusher's operation will be greatly benefitted by improvement of the accuracy of available data.

The skilled person realizes that a number of modifications of the embodiments described herein are possible without departing from the scope of the invention, which is defined in the appended claims. For example, cone crushers are used as example herein. However, the type of equipment on which the invention is applied is of less relevance. The situation is the same or at least very similar in many types of equipment, for example jaw crushers, gyratory crushers, high pressure roller crushers, high pressure grinding roll, and the advantages stated herein apply correspondingly.

The invention claimed is:

1. A monitoring system for a hydraulic system in a comminution apparatus including at least one pressurized accumulator, wherein the pressurized accumulator comprises a first chamber containing hydraulic liquid and a second chamber containing a pressurized gas, wherein said monitoring system comprises at least one pressure sensor and a control unit, wherein said pressure sensor is connected to said control unit, said pressure sensor being arranged to measure a pressure in said at least one accumulator and wherein the control unit is configured to determine that a pressure in said accumulator is outside of a predefined range and wherein the control unit is further configured to control a pressure regulating system arranged to restore the pressure in the pressurized accumulator, wherein the pressure sensor is arranged to measure a gas pressure in said second chamber, wherein the second chamber of each accumulator is connected to a source of pressurized gas via a manifold block, and wherein the manifold block comprises solenoid valves.

2. The monitoring system in accordance with claim 1, wherein the second chamber of each accumulator is connected to a source of pressurized gas.

3. The monitoring system in accordance with claim 1, wherein the control unit is configured to continuously monitor the pressure in the accumulator.

4. The monitoring system in accordance with claim 3, wherein the control unit is configured to control a pressure regulating system arranged to restore a pressure in said second chamber.

5. The monitoring system in accordance with claim 1, wherein the control unit is configured to determine that a pressure in said second chamber is outside of a predefined range.

6. The monitoring system in accordance with claim 1, wherein the gas comprises nitrogen.

7. The monitoring system in accordance with claim 1, wherein the control unit is configured to determine the pressure in the at least one accumulator at pre-defined time intervals.

8. The monitoring system in accordance with claim 1, wherein the control unit is configured to continuously determine the pressure in the at least one accumulator.

9. The monitoring system in accordance with claim 1, wherein said control unit is configured to determine the occurrence of a tramp event based on information from said pressure sensor.

10. A method of monitoring a hydraulic system in a comminution apparatus having a monitoring system in accordance with claim 1, said method comprising the steps of:

arranging a pressure sensor at an accumulator of a hydraulic system of said comminution apparatus;

transmitting output from said pressure sensor to a control unit; and using said control unit to control a pressure regulating system arranged to restore the pressure.

11. The method in accordance with claim 10, further comprising the step of:

based on said output, determining the occurrence of a tramp event.

12. The use of the monitoring system as claimed in claim 1 in a comminution apparatus.

13. A comminution apparatus including at least one pressurized accumulator comprising a first chamber containing hydraulic liquid and a second chamber containing a pressurized gas, said comminution apparatus comprising a monitoring system, wherein said monitoring system comprises at least one pressure sensor and a control unit, wherein said pressure sensor is connected to said control unit, said pressure sensor being arranged to measure a pressure in said at least one accumulator and wherein the control unit is configured to determine that a pressure in said accumulator is outside of a predefined range and wherein the control unit is further configured to control a pressure regulating system arranged to restore the pressure in the pressurized accumulator, wherein the pressure sensor is arranged to measure a gas pressure in said second chamber, wherein the second chamber of each accumulator is connected to a source of pressurized gas via a manifold block, and wherein the manifold block comprises solenoid valves.

* * * * *